(12) United States Patent
Kudoh

(10) Patent No.: US 9,658,424 B2
(45) Date of Patent: May 23, 2017

(54) OPTICAL APPARATUS EQUIPPED WITH ROTATION RESTRICTING MECHANISM FOR LENS HOLDING FRAMES

(71) Applicant: CANON KABUSHIKI KAISHA, Tokyo (JP)

(72) Inventor: Tomoyuki Kudoh, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 136 days.

(21) Appl. No.: 14/568,753

(22) Filed: Dec. 12, 2014

(65) Prior Publication Data
US 2015/0168667 A1    Jun. 18, 2015

(30) Foreign Application Priority Data

Dec. 17, 2013 (JP) ................. 2013-260198

(51) Int. Cl.
| | | |
|---|---|---|
| G02B 15/14 | (2006.01) | |
| G02B 7/02 | (2006.01) | |
| G03B 17/04 | (2006.01) | |
| G02B 7/10 | (2006.01) | |

(52) U.S. Cl.
CPC ............ *G02B 7/021* (2013.01); *G03B 17/04* (2013.01); *G02B 7/10* (2013.01); *G03B 2205/0046* (2013.01); *G03B 2217/002* (2013.01)

(58) Field of Classification Search
CPC ........ G02B 7/021; G02B 7/023; G02B 7/022; G02B 7/026; G02B 15/14
USPC ................... 359/694–706, 811–830
See application file for complete search history.

(56) References Cited

U.S. PATENT DOCUMENTS

| | | | |
|---|---|---|---|
| 6,606,206 B2 | 8/2003 | Takeshita et al. | |
| 2003/0072090 A1* | 4/2003 | Yasutomi | G02B 7/102 359/701 |
| 2004/0228006 A1* | 11/2004 | Yasutomi | G02B 7/102 359/699 |
| 2007/0109670 A1* | 5/2007 | Ishizuka | G03B 17/04 359/811 |

FOREIGN PATENT DOCUMENTS

| | | |
|---|---|---|
| JP | 09-211292 A | 8/1997 |
| JP | 2001-324663 A | 11/2001 |
| JP | 3842087 B2 | 11/2006 |

* cited by examiner

*Primary Examiner* — Mahidere Sahle
(74) *Attorney, Agent, or Firm* — Rossi, Kimms & McDowell LLP

(57) ABSTRACT

A mechanism which enables reduction of the diametrical size of a lens barrel of an optical apparatus. In the lens barrel, a third group lens unit has a rotation restricted portion. A fourth group lens holder rearward of the third group lens unit has a rotation restricting portion. A sixth group lens holder rearward of the fourth group lens holder has a rotation restricting portion. The rotation restricted portion of the third group lens unit and the rotation restricting portion of the fourth group lens holder are mutually engaged, whereby relative rotation between the lens unit and the lens holder is restricted, and the rotation restricted portion of the third group lens unit and the rotation restricting portion of the sixth group lens holder are mutually engaged, whereby relative rotation between the lens unit and the lens holder is restricted.

4 Claims, 7 Drawing Sheets

OPTICAL APPARATUS EQUIPPED WITH ROTATION RESTRICTING MECHANISM FOR LENS HOLDING FRAMES

BACKGROUND OF THE INVENTION

Field of the Invention

The invention relates to an optical apparatus equipped with a rotation restricting mechanism for a plurality of lens holding frames.

Description of the Related Art

As a lens barrel for an optical apparatus, such as a digital camera, there has been known one which is equipped with a zoom mechanism configured to restrict rotation of each of a plurality of lens holders holding a plurality of lenses by a rectilinear motion barrel and move the lens holders along an optical axis by rotation of a cam barrel, to thereby move the lenses to respective predetermined positions.

Recently, in response to an increasing demand for a higher zoom magnification, a lens barrel tends to have a larger number of lenses and have a longer length in its fully extended state, i.e. the lens barrel tends to have a larger size. On the other hand, there is also a demand for reduction of the thickness of an optical apparatus, and hence it is required to minimize the size of the optical apparatus in a retracted state of the lens barrel. To meet this demand, it is envisaged to reduce the thickness of an optical apparatus by connecting barrels, each having a reduced size in the optical axis direction, in a multi-stage configuration, or alternatively by arranging a plurality of cams such that the cams do not cross each other (see e.g. Japanese Patent Laid-Open Publication No. 2001-324663 and Publication of Japanese Patent No. 3842087).

However, in either of the techniques disclosed in Japanese Patent Laid-Open Publication No. 2001-324663 and Publication of Japanese Patent No. 3842087, a rectilinear motion barrel is used to restrict rotation of each of a plurality of lenses, and hence the size of a lens barrel is diametrically increased by an amount corresponding to the thickness of the rectilinear motion barrel. To solve this problem, a lens barrel has been proposed which is configured to advance and retract a plurality of lenses relative to a cam barrel along the optical axis in a state where each of the lenses has its rotation restricted, without providing a rectilinear motion barrel (see e.g. Japanese Patent Laid-Open Publication No. H09-211292).

In this lens barrel disclosed in Japanese Patent Laid-Open Publication No. H09-211292, the cam barrel has an inner peripheral surface formed with cam grooves which correspond to a first group lens, a second group lens, and a third group lens, respectively. In the lens barrel, the third group lens has its rotation restricted by a fixed barrel, the second group lens has its rotation restricted by the third lens, and the first group lens has its rotation restricted by the second lens.

In the lens barrel, however, since the cam grooves corresponding to the respective lenses are all formed in the inner peripheral surface of the single cam barrel, the arrangement of the cam grooves is restricted. Further, the third group lens does not move relative to the cam barrel along the optical axis, but advances and retracts together with the cam barrel along the optical axis, and hence the arrangement of the lenses in the optical axis direction and the motion trajectory of each of the lenses are restricted, which makes it difficult to realize an even higher zoom magnification.

SUMMARY OF THE INVENTION

The invention provides a mechanism which makes it possible to achieve reduction of the diametrical size of a lens barrel provided for an optical apparatus and the thickness of the optical apparatus, as well as to realize an even higher zoom magnification.

In a first aspect of the invention, there is provided an optical apparatus comprising a first lens holding frame configured to hold a first lens, a second lens holding frame configured to hold a second lens and disposed rearward of the first lens holding frame, and a third lens holding frame configured to hold a third lens and disposed rearward of the second lens holding frame, wherein the first lens holding frame has a first protruding portion formed to protrude toward the second lens holding frame, wherein the second lens holding frame has a first engagement portion for engagement with the first protruding portion, wherein the third lens holding frame has a second protruding portion formed to protrude toward the first lens holding frame, for engagement with the first protruding portion, wherein the first protruding portion and the first engagement portion are brought into engagement with each other, whereby rotation of the second lens holding frame relative to the first lens holding frame is restricted, and wherein the first protruding portion and the second protruding portion are brought into engagement with each other, whereby rotation of the first lens holding frame relative to the third lens holding frame is restricted.

In a second aspect of the invention, there is provided an optical apparatus comprising a first lens holding frame configured to hold a first lens, a second lens holding frame configured to hold a second lens and disposed rearward of the first lens holding frame, and a third lens holding frame configured to hold a third lens and disposed rearward of the second lens holding frame, wherein the first lens holding frame has a first restricting portion that is brought into engagement with the second lens holding frame, to thereby restrict rotation of the second lens holding frame relative to the first lens holding frame, and wherein the third lens holding frame has a second restricting portion that is brought into engagement with the first restricting portion, to thereby restrict rotation of the first lens holding frame relative to the third lens holding frame.

According to the invention, it is possible not only to achieve reduction of the size of an optical apparatus, but also to realize a higher zoom magnification.

Further features of the invention will become apparent from the following description of exemplary embodiments (with reference to the attached drawings).

DESCRIPTION OF THE EMBODIMENTS

The invention will now be described in detail below with reference to the accompanying drawings showing embodiments thereof.

Figure 1A:
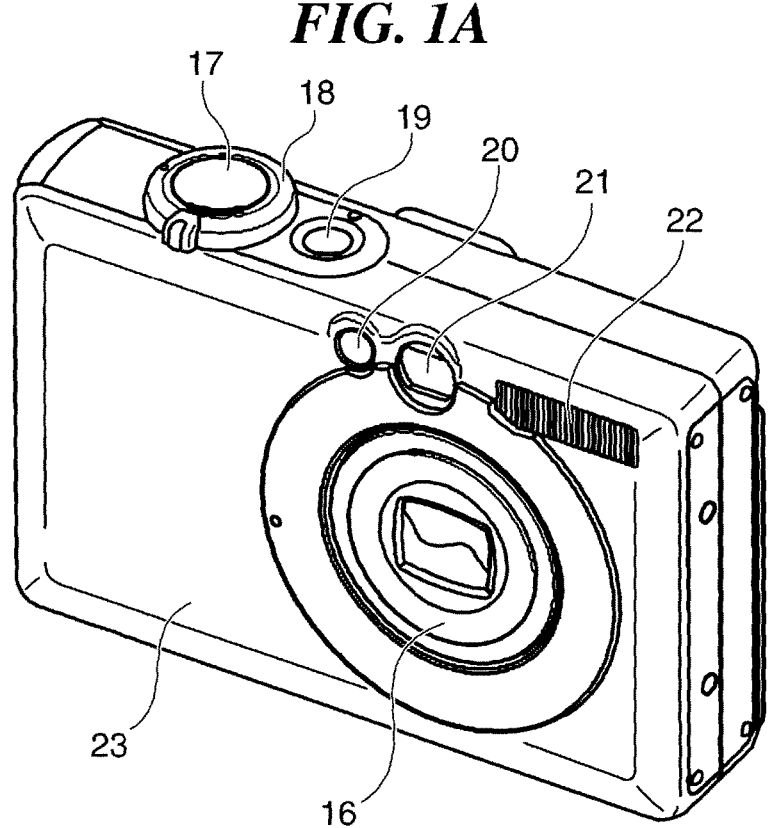
FIG. 1A is a front perspective view of a digital camera as an example of an optical apparatus equipped with a lens barrel according to an embodiment of the invention.
Figure 1B:
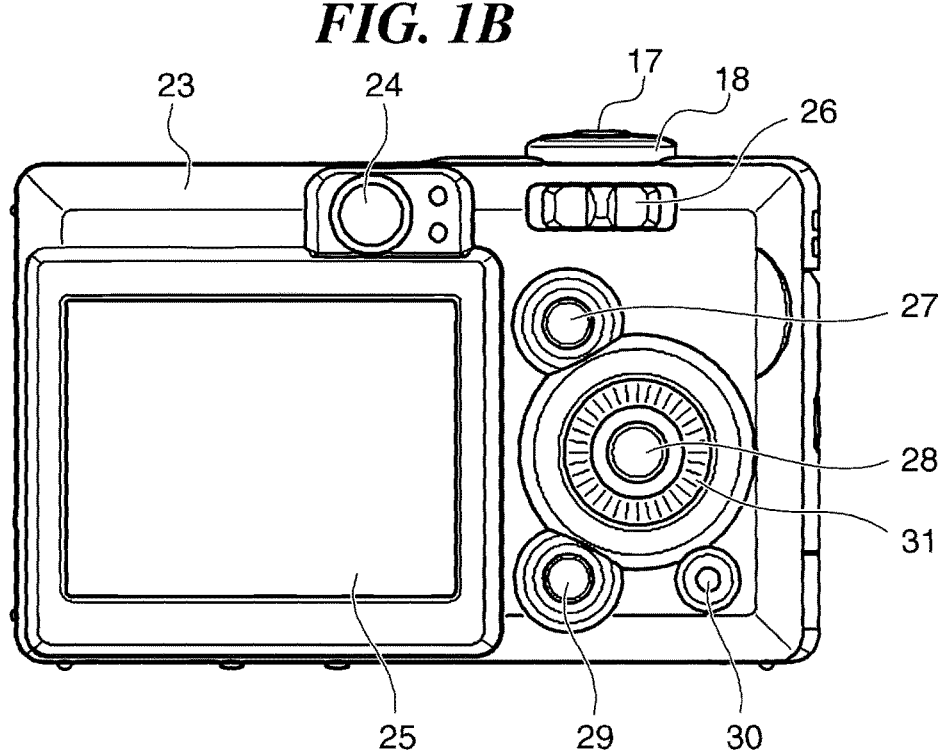
FIG. 1B is a rear view of the digital camera shown in FIG. 1A.

FIG. 1A is a front perspective view of a digital camera as an example of an optical apparatus equipped with a lens barrel, according to an embodiment of the invention. FIG. 1B is a rear view of the digital camera shown in FIG. 1A.

As shown in FIG. 1A, in a front surface of the digital camera 23, there are arranged a viewfinder 21 for determining a composition of an object, an auxiliary light source 20 for use in photometry and focus detecting, a strobe device 22, and a lens barrel 16. The lens barrel 16 is a zoom type that moves along an optical axis between a shooting position and a retracted position to thereby change a zoom magnification.

In a top surface of the digital camera 23, there are arranged a release button 17, a power supply switching button 19, and a zoom switch 18. Further, as shown in FIG. 1B, in a rear surface of the digital camera 23, there are arranged operation buttons 26 to 31, a display 25 implemented e.g. by an LCD, and a finder eyepiece 24.

Figure 2:
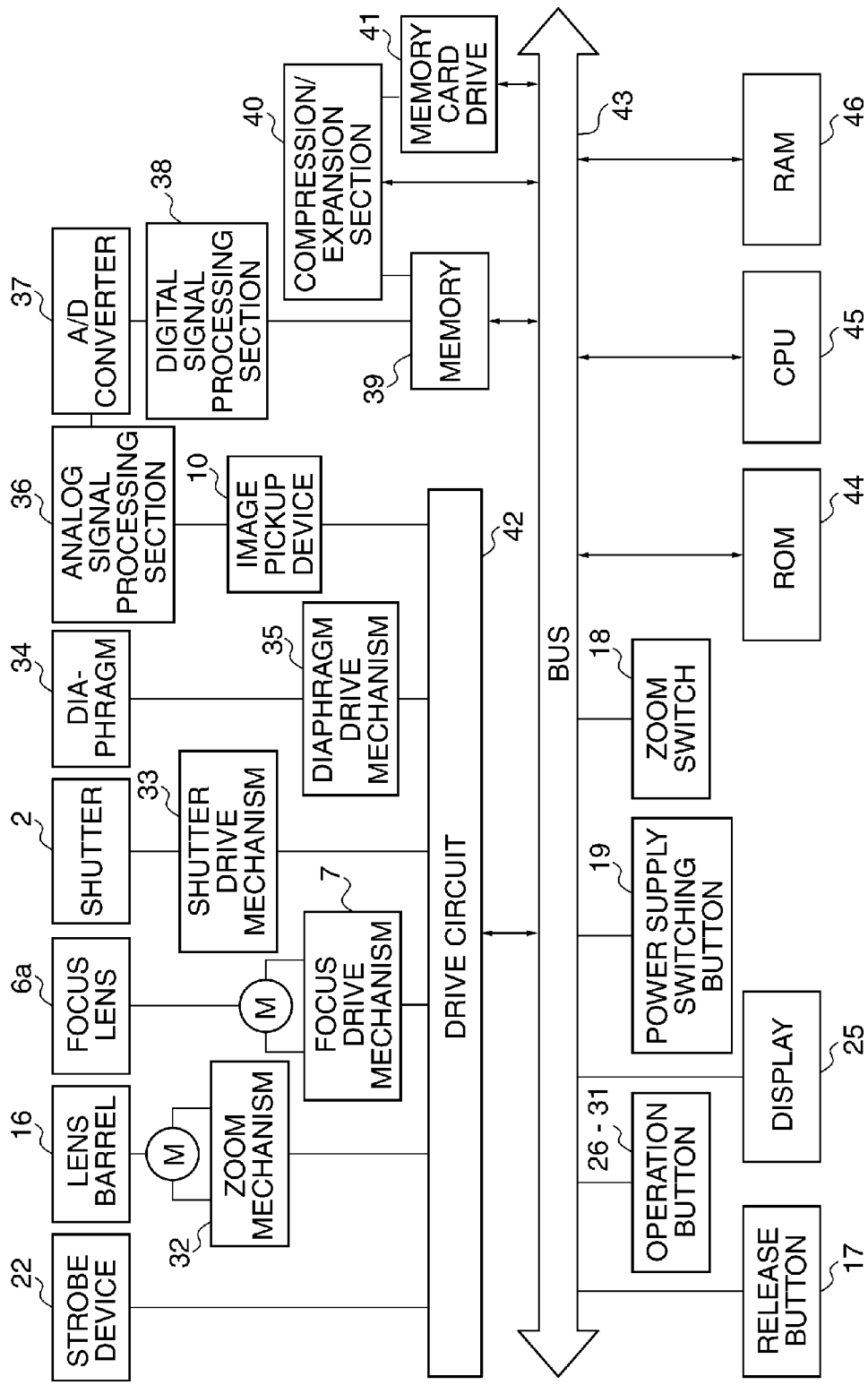
FIG. 2 is a control block diagram of the digital camera.

FIG. 2 is a control block diagram of the digital camera 23 of the embodiment. Connected to a bus 43 are a CPU 45, a ROM 44, a RAM 46, the release button 17, the operation buttons 26 to 31, the display 25, the power supply switching button 19, the zoom switch 18, a memory 39, a compression/expansion section 40, a memory card drive 41, and a drive circuit 42.

Connected to the drive circuit 42 are a zoom mechanism 32 for zoom-driving the lens barrel 16, a focus drive mechanism 7 for driving a focus lens 6a, a shutter drive mechanism 33 for driving a shutter 2, and a diaphragm drive mechanism 35 for driving a diaphragm 34. Further, connected to the drive circuit 42 are an image pickup device 10 implemented by a CCD sensor or a CMOS sensor and the strobe device 22. An A/D converter 37 is connected to the image pickup device 10 via an analog signal processing section 36, and a digital signal processing section 38 is connected to the A/D converter 37. The units connected to the drive circuit 42 are drivingly controlled via the drive circuit 42 based on signals from the CPU 45.

The ROM 44 stores various kinds of control programs and so forth, and the RAM 46 stores data required for the various control programs. The analog signal processing section 36 performs analog processing on the image data output from the image pickup device 10 and outputs the processed image data to the A/D converter 37.

The A/D converter 37 converts the analog data received from the analog signal processing section 36 to digital data and then outputs the digital data to the digital signal processing section 38. The digital signal processing section 38 performs predetermined processing on the digital data received from the A/D converter 37, and then outputs the processed digital data to the memory 39 for storage.

The image data stored in the memory 39 is subjected to compression processing, such as JPEG compression or TIFF compression, by the compression/expansion section 40, and is then output to a memory card mounted in the memory card drive 41 for storage.

The compression/expansion section 40 performs expansion processing on image data stored in the memory 39 or in the memory card drive 41, whereby an image is displayed on the display 25 via the bus 43. When the user views the image displayed on the display 25 and determines that the image is unnecessary, he/she can operate the operation button 31 to erase the same (image data).

Next, the lens barrel 16 will be described in detail with reference to FIGS. 3 to 7B.

Figure 3:
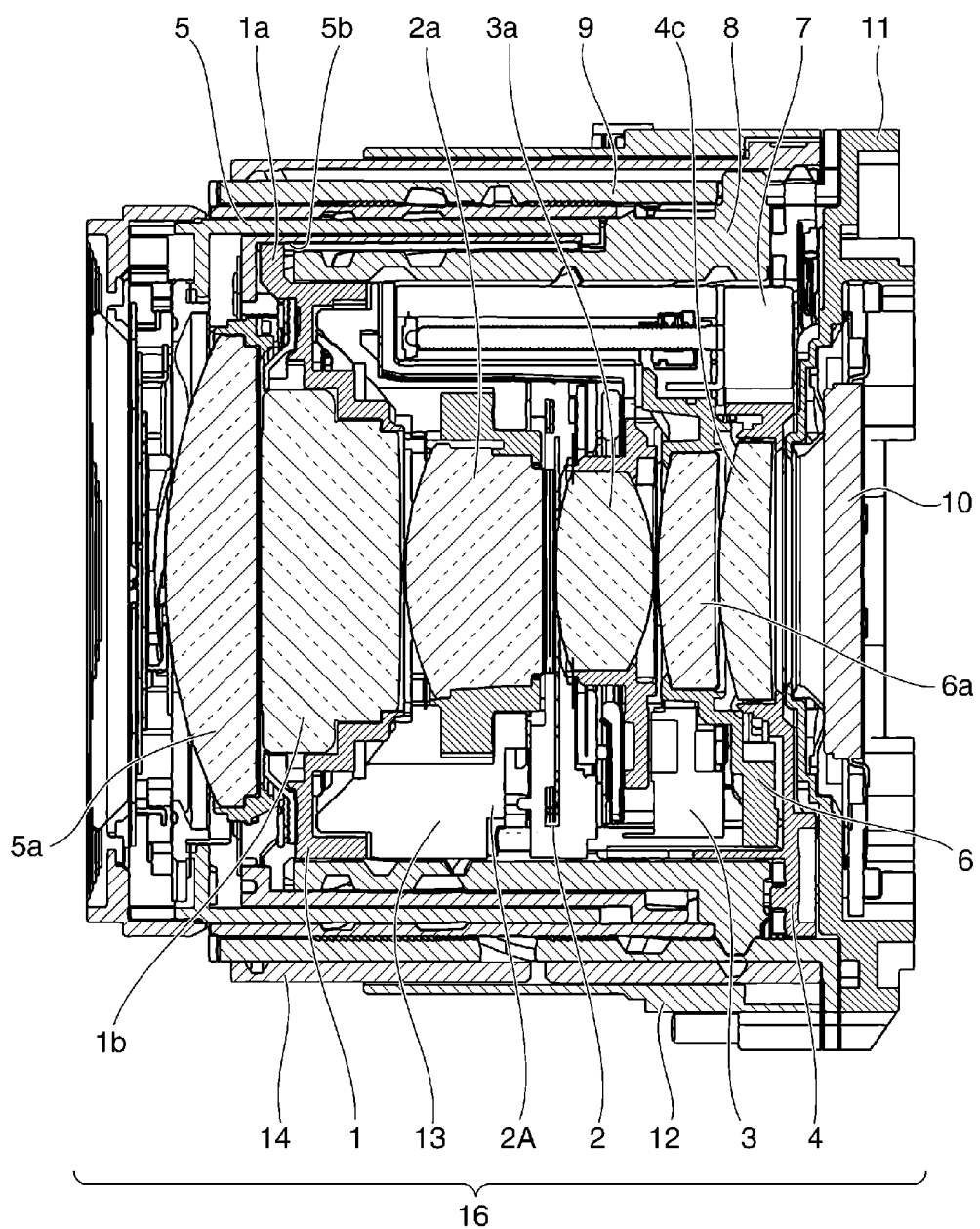
FIG. 3 is a cross-sectional view of the lens barrel provided in the digital camera, in a retracted state.
Figure 4:
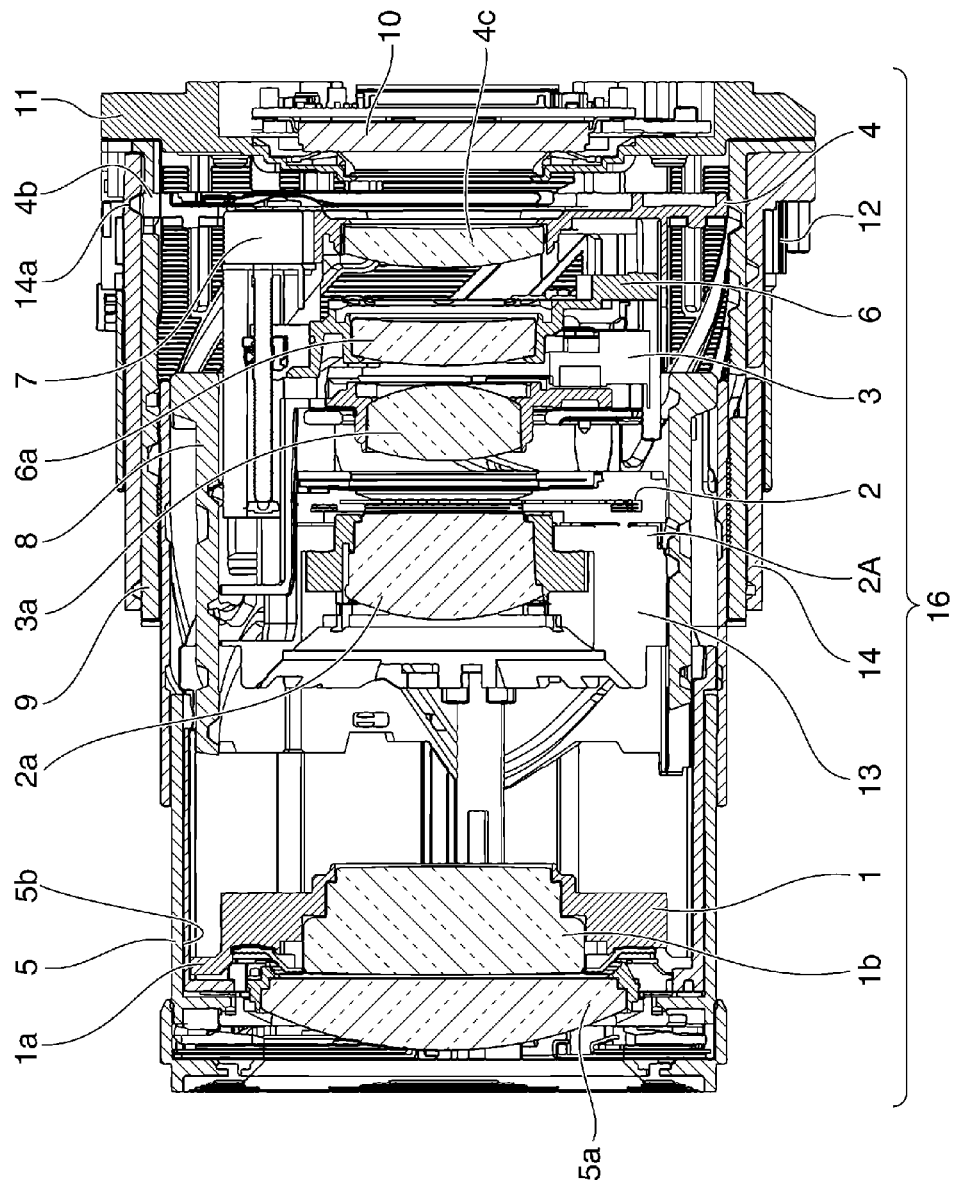
FIG. 4 is a cross-sectional view of the lens barrel shown in FIG. 3 in a shooting state (extended state).
Figure 5:
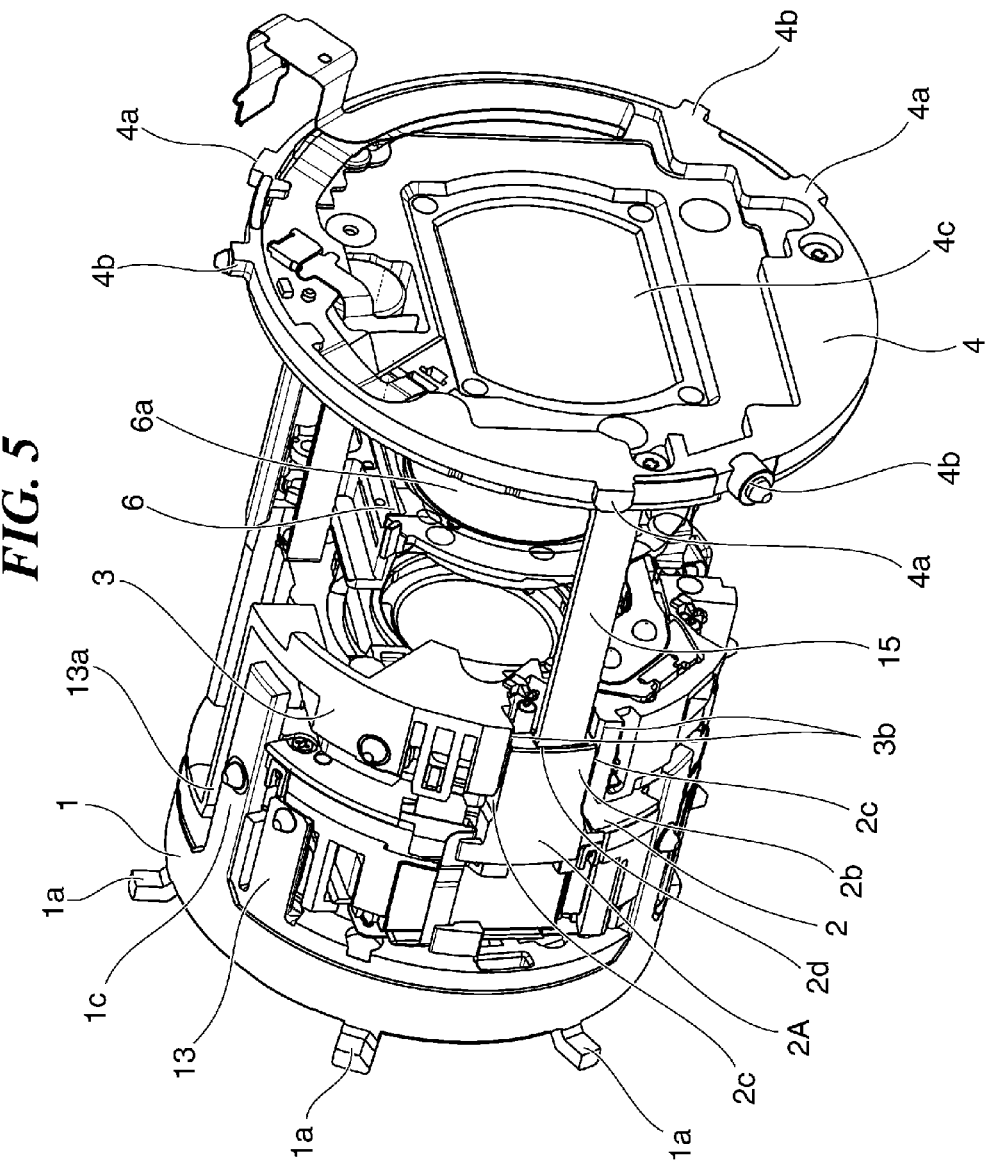
FIG. 5 is a perspective view of an internal structure of the lens barrel.
Figure 6:
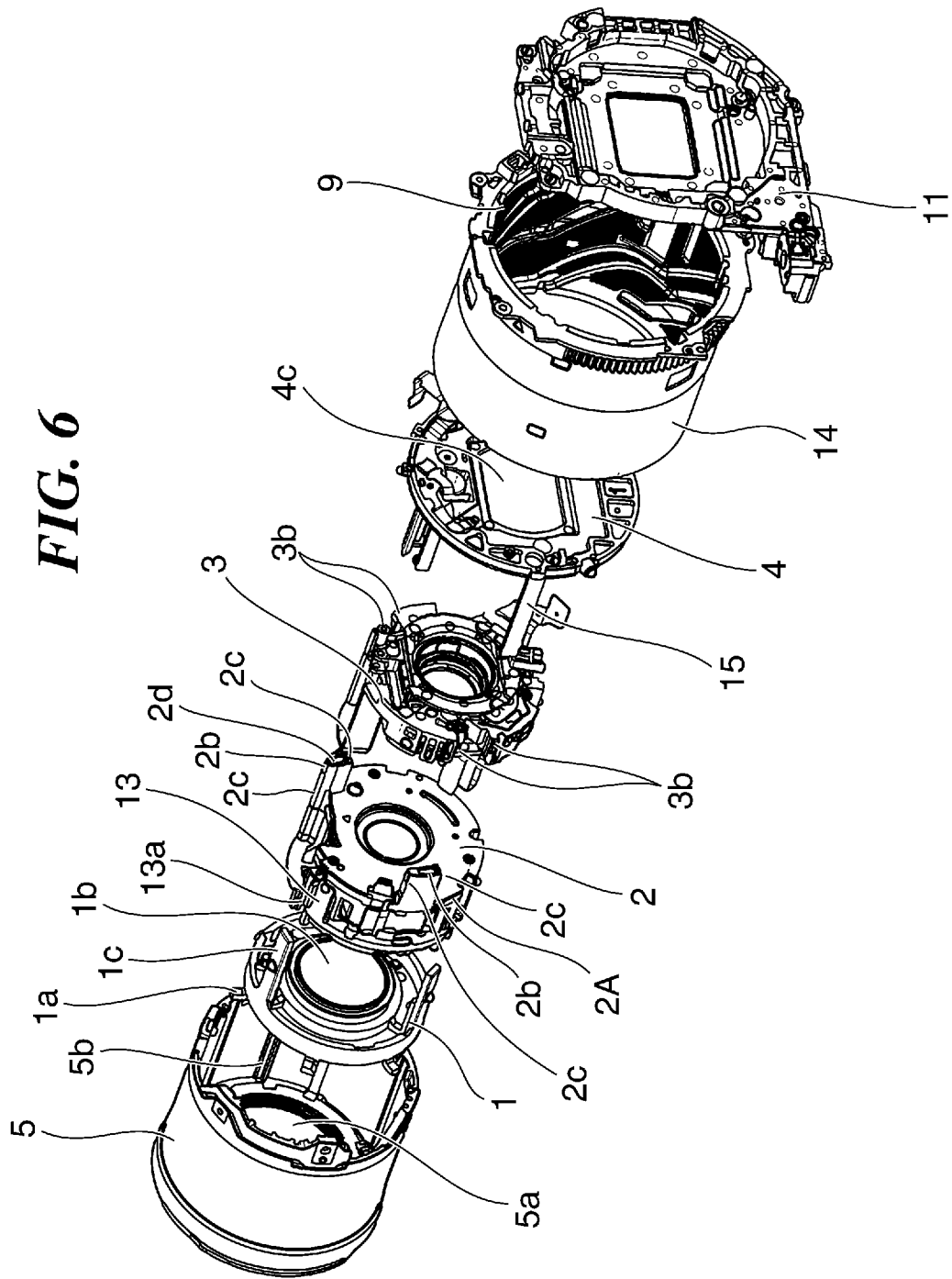
FIG. 6 is an exploded perspective view of the lens barrel.

FIG. 3 is a cross-sectional view of the lens barrel 16 in a retracted state. FIG. 4 is a cross-sectional view of the lens barrel 16 in a shooting state (extended state). FIG. 5 is a perspective view of an internal structure of the lens barrel 16. FIG. 6 is an exploded perspective view of the lens barrel 16.

As shown in FIGS. 3 to 6, the lens barrel 16 is provided with a second group lens holder 1 for holding a second group lens 1b. On an imaging surface side of the second group lens holder 1, there is disposed a third group lens holder 13 for holding a third group lens 2a, and on an imaging surface side of the third group lens holder 13, there is disposed the shutter 2. The third group lens holder 13 and the shutter 2 form a third group lens unit 2A.

On an imaging surface side of the shutter 2, there is disposed a fourth group lens holder 3 for holding a fourth group lens 3a that functions as an anti-shake lens, and on an imaging surface side of the fourth group lens holder 3, there is disposed a focus lens holder 6 for holding the focus lens 6a.

On an imaging surface side of the focus lens holder 6, there is disposed a sixth group lens holder 4 for holding a sixth group lens 4c. The focus lens holder 6 and the sixth group lens holder 4 form a focus unit. The focus drive mechanism 7 is fixed to the sixth group lens holder 4, and the focus lens holder 6 is driven by the focus drive mechanism 7 to move along the optical axis and perform focusing operation. Further, on an imaging surface side of the sixth group lens holder 4, there is disposed a sensor holder 11 for holding the image pickup device 10. Note that the focus drive mechanism 7 is e.g. a motor.

As described above, according to the present embodiment, the second group lens holder 1, the third group lens unit 2A, the fourth group lens holder 3, and the sixth group lens holder 4 are sequentially arranged in the mentioned order from the object side (the front) toward the imaging surface side (the rear). Here, the second group lens holder 1 corresponds to an example of a fourth lens holding frame of the invention. The third group lens unit 2A or the third group lens holder 13 as a component of the third lens unit 2A corresponds to an example of a first lens holding frame of the invention. The fourth group lens holder 3 corresponds to an example of a second lens holding frame of the invention. The sixth group lens holder 4 corresponds to an example of a third lens holding frame of the invention.

As shown in FIGS. 3 and 4, around an outer periphery of the second group lens holder 1, the third group lens unit 2A, the fourth group lens holder 3, and the sixth group lens holder 4, there is disposed a movable cam ring 8. The movable cam ring 8 has an inner peripheral surface thereof formed with cam grooves which are associated, respectively, with the second group lens holder 1, the third group lens unit 2A, and the fourth group lens holder 3.

Each of the second group lens holder 1, the third group lens unit 2A, and the fourth group lens holder 3 is capable of moving forward and backward along the optical axis, following an associated one of the cam grooves formed in the inner peripheral surface of the movable cam ring 8.

On an outer periphery of the movable cam ring 8, there is disposed a first group lens holder 5 for holding a first group lens 5a. The first group lens 5a is disposed on the object side of the second group lens 1*b*. The first group lens holder 5 is capable of moving forward and backward along the optical axis, following a groove formed in an outer peripheral surface of the movable cam ring 8.

Further, on the outer periphery of the movable cam ring 8, there is disposed a fixed cam ring 9 at a location outward of the first group lens holder 5. The movable cam ring 8 is capable of moving forward and backward along the optical axis, following a cam groove formed in an inner peripheral surface of the fixed cam ring 9. On an outer periphery of the fixed cam ring 9, there is disposed a drive ring 14. The drive ring 14 has its outer periphery covered and protected by a cover member 12. Note that a rotation-restricting protruding portion 1*a* and a straight advance groove 5*b* appearing in FIGS. 3 and 4 will be described hereinafter.

As shown in FIGS. 4 and 5, the sixth group lens holder 4 has cam followers 4*b* and rectilinear slide keys 4*a* each formed in an outer periphery thereof at three respective circumferential locations substantially equally spaced from each other. The cam followers 4*b* are engaged with a cam groove 14*a* formed in an inner peripheral surface of the drive ring 14. With this, when the drive ring 14 is driven for rotation by the zoom mechanism 32, the sixth group lens holder 4 moves forward and backward along the optical axis, following the cam groove 14*a*. At this time, the rectilinear slide keys 4*a* are held in engagement with respective straight advance grooves formed in the inner peripheral surface of the fixed cam ring 9, whereby rotation of the sixth group lens holder 4 is restricted.

In accordance with the rotation of the drive ring 14, the movable cam ring 8 moves forward and backward along the optical axis while rotating, following the cam groove of the fixed cam ring 9. Further, in accordance with the rotation of the movable cam ring 8, the second group lens holder 1, the third group lens unit 2A, the fourth group lens holder 3, the sixth group lens holder 4, and the first group lens holder 5 move forward and backward along the optical axis.

As shown in FIGS. 5 and 6, the outer periphery of the sixth group lens holder 4 is formed with rotation restricting portions 15 each extending toward the object side in parallel with the optical axis. Further, the shutter 2 that forms the third group lens unit 2A is integrally formed with rotation restricted portions 2*b*. The rotation restricted portions 2*b* corresponds to an example of a first protruding portion or a first restricting portion of the invention. The rotation restricting portions 15 corresponds to an example of a second protruding portion or a second restricting portion of the invention.

Each of the rotation restricted portions 2*b* is formed in a sheath shape, and has an insertion hole 2*d* opening toward the sixth group lens holder 4, and when the sixth group lens holder 4 moves forward and backward along the optical axis, the rotation restricting portions 15 are inserted into the insertion holes 2*d* of the rotation restricted portions 2*b*, respectively, whereby the rotation restricting portions 15 are held therein. At this time, the rotation of the sixth group lens holder 4 is restricted by the fixed cam ring 9, and consequently, the rotation of the third group lens unit 2A is restricted by the sixth group lens holder 4.

The rotation restricting portions 15 and the rotation restricted portions 2*b* are formed in pairs in a manner circumferentially spaced from each other by about 180°. The sixth group lens holder 4 and the third group lens unit 2A move relative to each other in the optical axis direction along the respective different cam trajectories of the movable cam ring 8, and during the relative motion between the sixth group lens holder 4 and the third group lens unit 2A, the rotation restricting portions 15 are held inserted in the respective rotation restricted portions 2*b*.

On opposite sides of each of the rotation restricted portions 2*b* in the circumferential direction of the lens barrel 16, there are formed rotation-restricting contacted portions 2*c*, respectively. Rotation-restricting contacting portions 3*b* formed in the fourth group lens holder 3 are circumferentially brought into contact with each of the rotation-restricting contacted portions 2*c*. Thus, the rotation of the fourth group lens holder 3 is restricted by the third group lens unit 2A. The rotation-restricting contacting portions 3*b* corresponds to an example of a first engagement portion of the invention.

The second group lens holder 1 has an outer periphery circumferentially formed with a plurality of rotation restricting portions 1*c* each extending toward the imaging surface side in parallel with the optical axis. When the second group lens holder 1 and the third group lens holder 13 move relative to each other along the optical axis, the rotation restricting portions 1*c* are inserted into respective straight advance grooves 13*a* formed in an outer peripheral surface of the third group lens holder 13. Thus, the rotation of the second group lens holder 1 is restricted by the third group lens unit 2A. Note that the rotation restricting portions 1*c* and the straight advance grooves 13*a* correspond, respectively, to examples of a third protruding portion and a second engagement portion of the present invention.

Further, in the outer periphery of the second group lens holder 1, there are circumferentially formed the plurality of rotation-restricting protruding portions 1*a* (see FIGS. 3 and 4, as required) each extending radially outward. When the second group lens holder 1 and the first group lens holder 5 move relative to each other along the optical axis, the rotation-restricting protruding portions 1*a* are radially inserted into the straight advance groove 5*b* (see FIGS. 3 and 4, as required) formed in an inner periphery of the first group lens holder 5. Thus, the rotation of the first group lens holder 5 is restricted by the second group lens holder 1.

Figure 7A:
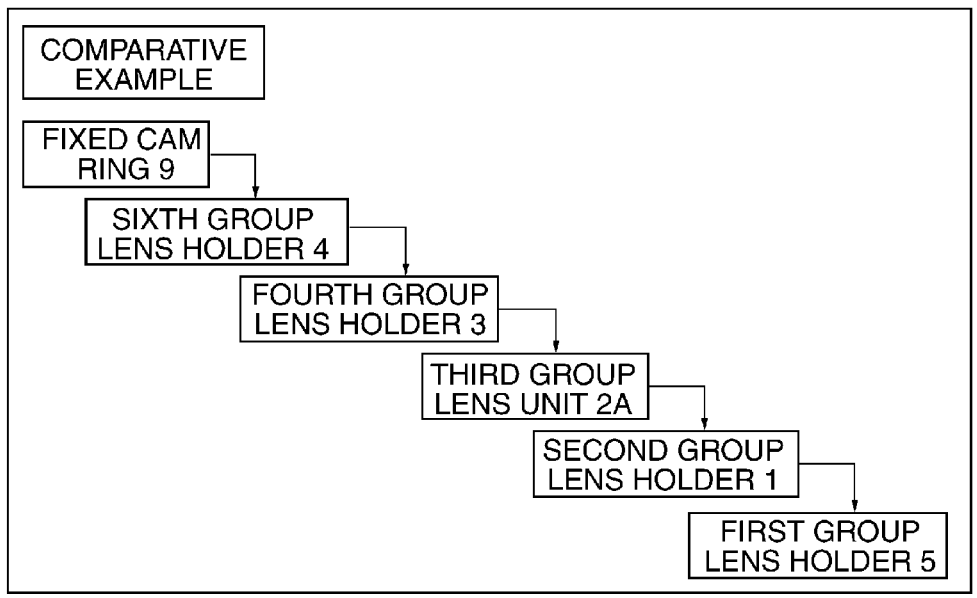
FIGS. 7A and 7B are conceptual views useful in explaining how to restrict rotation of each of a plurality of lens holders relative to a movable cam ring without providing a rectilinear motion barrel, while making a comparison between the lens barrel of the invention (embodiment example) shown in FIG. 7B and a conventional lens barrel (comparative example) shown in FIG. 7A.
Figure 7B:
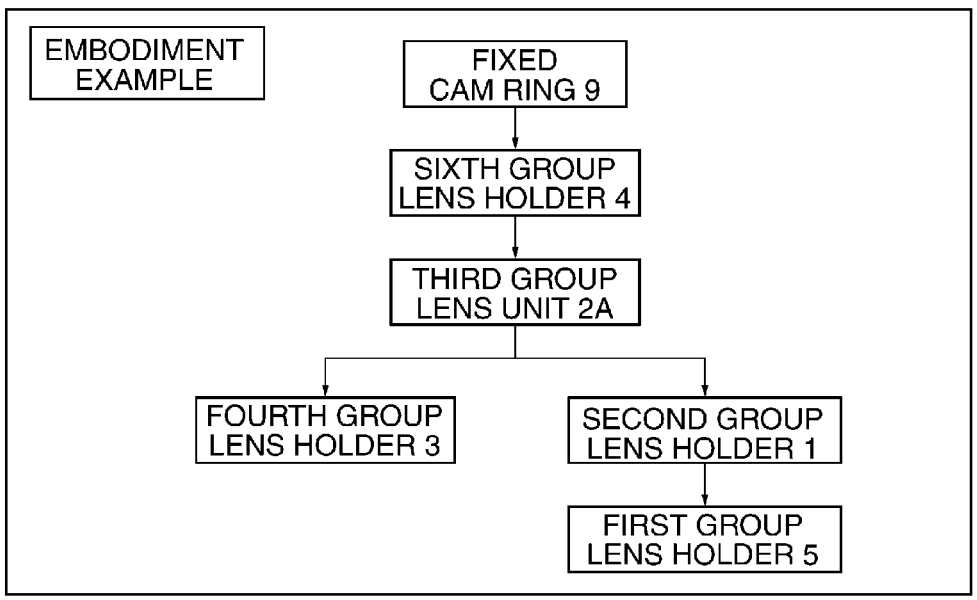

FIGS. 7A and 7B are conceptual views useful in explaining how to restrict rotation of each of the lens holders relative to the movable cam ring 8 without providing a rectilinear motion barrel, while making a comparison between the lens barrel 16 (embodiment example) shown in FIG. 7B and a conventional lens barrel (comparative example) shown in FIG. 7A.

In the comparative example shown in FIG. 7A, the rotation of the six group lens holder 4 is restricted by the fixed cam ring 9, the rotation of the fourth group lens holder 3 is restricted by the six group lens holder 4, and the rotation of the third group lens unit 2A is restricted by the fourth group lens holder 3. Further, the rotation of the second group lens holder 1 is restricted by the third group lens unit 2A, and the rotation of the first group lens holder 5 is restricted by the second group lens holder 1. With this configuration, restriction of the rotation of each of the lens holders [1, 2A, and 3 to 5] (hereinafter, the second group lens holder 1, the third group lens unit 2A, the fourth group lens holder 3, the six group lens holder 4, and the first group lens holder 5 are generically referred to as the lens holders) causes backlash between the lens holders [1, 2A, and 3 to 5], and the backlash is accumulated. As a final consequence, the first group lens holder 5 suffers from a large backlash.

In contrast, in the embodiment example shown in FIG. 7B, the rotation of the sixth group lens holder 4 is restricted by the fixed cam ring 9, and the rotation of the third group lens unit 2A disposed in a central portion of the lens barrel 16 in the optical axis direction is restricted by the sixth group lens holder 4. Further, the rotation of the fourth group lens holder 3 disposed between the sixth group lens holder 4 and the third group lens unit 2A is restricted by the third group lens unit 2A, and the rotation of the second group lens holder 1 disposed on the object side of the third group lens unit 2A is also restricted by the third group lens unit 2A. Furthermore, the rotation of the first group lens holder 5 disposed on the object side of the second group lens holder 1 is restricted by the second group lens holder 1.

With this configuration, it is possible to prevent not only accumulation of backlash in the second group lens holder 1 and the third group lens unit 2A due to restriction of the rotation of each of the lens holders [1, 2A, and 3 to 5], but also accumulation of backlash in the first group lens holder 5. Further, the amount of backlash of the second group lens holder 1 with respect to the third group lens unit 2A and the amount of backlash of the fourth group lens holder 3 with respect to the third group lens unit 2A are made substantially equal to each other, so that it is possible to prevent eccentricity of the second group lens holder 1 and the fourth group lens holder 3 relative to the optical axis. Furthermore, from the viewpoint of the sensitivity of an optical system, it is possible to prevent relative tilt or eccentricity of the sixth group lens holder 4, which, together with the third group lens unit 2A, forms the focus unit.

As described above, according to the present embodiment, the lens holders [1, 2A, and 3 to 5] each having a reduced size in the optical axis direction are connected to each other to form the lens barrel 16 in a multi-stage configuration, so that it is possible to reduce the thickness of the lens barrel 16. Further, the rotation of each of the lens holders [1, 2A, and 3 to 5] can be restricted without providing a rectilinear motion barrel, and hence it is possible to reduce the diametrical size of the lens barrel 16. As a consequence, reduction of the thickness and size of the digital camera 23 can be achieved.

Furthermore, according to the present embodiment, it is not required to form cam grooves associated with the respective lens holders [1, 2A, and 3 to 5] in the inner peripheral surface of the movable cam ring 8 as a single component, and the lens holders [1, 2A, and 3 to 5] are each configured to individually move relative to each other in the optical axis direction. Therefore, the degree of freedom in designing the arrangement and trajectory of motion of each of the lens holders [1, 2A, and 3 to 5] in the optical axis direction is increased, which makes it possible to achieve an even higher optical zoom magnification.

Note that the invention is not limited to the above-described embodiment, but the material, shape, size, form, number, location, etc. of each of the members can be changed without departing from the spirit and scope of the invention.

For example, although in the above-described embodiment, the rotation of each of the second group lens holder 1 and the fourth group lens holder 3 disposed on the respective opposite sides of the third group lens unit 2A in the optical axis direction is restricted by the third group lens unit 2A, this is not limitative, but any other configuration can be adopted insofar as a lens holder having its rotation restricted is configured to restrict the rotation of each of two other lens holders disposed on respective opposite sides thereof in the optical axis direction.

For example, the rotation of each of the first lens holder 5 and the third group lens unit 2A disposed on the respective opposite sides of the second group lens holder 1 may be restricted e.g. by the second group lens holder 1 having its rotation restricted by the sixth lens holder 4. In this case, the first group lens holder 5 corresponds to the fourth lens holding frame of the invention, and the second group lens holder 1 corresponds to the first lens holding frame of the invention. Further, the third group lens unit 2A corresponds to the second lens holding frame of the invention, and the sixth group lens holder 4 corresponds to the third lens holding frame of the invention.

While the invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2013-260198 filed Dec. 17, 2013 which is hereby incorporated by reference herein in its entirety.

What is claimed is:

1. An optical apparatus comprising:
  a first lens holding frame configured to hold a first lens;
  a second lens holding frame configured to hold a second lens and disposed rearward of said first lens holding frame; and
  a third lens holding frame configured to hold a third lens and disposed rearward of said second lens holding frame,
  wherein said first lens holding frame has a first protruding portion formed to protrude toward said second lens holding frame,
  wherein said second lens holding frame has a first engagement portion for engagement with said first protruding portion,
  wherein said third lens holding frame has a second protruding portion formed to protrude toward said first lens holding frame, for engagement with said first protruding portion,
  wherein said first protruding portion and said first engagement portion are brought into engagement with each other, whereby rotation of said second lens holding frame relative to said first lens holding frame is restricted, and
  wherein said first protruding portion and said second protruding portion are brought into engagement with each other, whereby rotation of said first lens holding frame relative to said third lens holding frame is restricted.

2. The optical apparatus according to claim 1, wherein a portion of said first protruding portion where said first engagement portion is engaged and a portion of said first protruding portion where said second protruding portion are engaged are different from each other.

3. The optical apparatus according to claim 2, wherein said first protruding portion has a hole formed therein, and
  wherein said second protruding portion is inserted into the hole, whereby said first protruding portion and said second protruding portion are engaged with each other.

4. The optical apparatus according to claim 1, further comprising:
  a fourth lens holding frame configured to hold a fourth lens and disposed forward of said first lens holding frame, and
  wherein said fourth lens holding frame has a third protruding portion formed to protrude toward said first lens holding frame,
  wherein said first lens holding frame has a second engagement portion for engagement with said third protruding portion, and wherein said third protruding portion and said second engagement portion are brought into engagement with each other, whereby rotation of said fourth lens holding frame relative to said first lens holding frame is restricted.

* * * * *